Patented May 10, 1932

1,857,470

UNITED STATES PATENT OFFICE

CHARLES H. MILLIGAN AND SIMON KLOSKY, OF NEWARK, NEW JERSEY, ASSIGNORS TO THE AMERICAN AGRICULTURAL CHEMICAL COMPANY, A CORPORATION OF DELAWARE

PROCESS FOR OBTAINING ORTHOPHOSPHORIC ACID AND/OR CONVERSION PRODUCTS THEREOF

No Drawing.   Application filed August 26, 1930.   Serial No. 477,984.

Our invention is applicable generally to the recovery of orthophosphoric acid and/or conversion products thereof, from materials containing inorganic phosphates or acid phosphates. Suitable materials are: animal bone matter, deposits containing recent or fossil bone matter, mineral deposits containing phosphates of any kind, such as apatite, and artificial materials, such as superphosphates.

One of us has heretofore invented a process for obtaining phosphoric acid and/or conversion products thereof, from materials of the type described, which comprises treating the material with a sulphuric acid in amount sufficient to replace the combined phosphoric acid, with the resultant formation of orthophosphoric acid. The orthophosphoric acid is then separated from the residue of unconverted material and insoluble reaction products by the use of an extraction liquid, predominantly organic, which is water immiscible and is a solvent for orthophospheric acid. The phosphoric compounds and/or conversion products thereof are then removed from the extraction liquid by appropriate treatment.

This invention relates particularly to the type of extraction liquid to be utilized in combination with the other steps. We have jointly found that exceptionally favorable results are obtained by the use of an extraction liquid containing a water immiscible mono hydroxyl alcohol of not exceeding 8 carbon atoms in the chain carrying the hydroxyl group and an aliphatic ester. The aliphatic ester is preferably the ester of an alcohol of not exceeding 8 carbon atoms in the chain carrying the hydroxyl group, and certain further advantage results from the employment of an ester containing, in combination, the same alcohol which is present in free condition in the extraction liquid. For best results the extraction liquid consists predominantly of a water immiscible mono hydroxyl alcohol of not exceeding 8 carbon atoms in the chain carrying the hydroxyl group and an aliphatic ester, and the alcohol is preferably present in the ratio of from 20 to 80 parts by weight of the total ester and alcohol.

An extraction liquid, of the type described, manifests a high solubility for orthophosphoric acid together with an exceptionally high ratio of orthophosphoric acid to undersired impurities, and the capacity to deliver a major part of the dissolved orthophosphoric acid when contacted with moderate quantities of water or solutions containing water.

In general, we employ sulphuric acid of from 25% to 93%, $H_2SO_4$ content, for example 75%. This is applied to the raw material in quantity sufficient to replace at least a part of the phosphoric acid present with the formation of orthophosphoric acid, and the mixture is preferably denned for several hours to complete the reaction. For the maximum purity of end product, we find it desirable to carefully limit the amount of acid applied so that it is slightly less than that necessary to combine with the bases present in the raw material, excluding, of course, those which were previously combined with sulphuric oxide. The mixture of undissolved material and soluble reaction products is then contacted with an extraction liquid of the type described, comprising a water immiscible mono hydroxyl alcohol of not exceeding 8 carbon atoms in the chain carrying the hydroxyl group and an aliphatic ester. The extraction liquid must be water immiscible and predominantly organic.

For the purpose of this application, we may define a water immiscible liquid to be one which is not soluble in water or aqueous solutions of phosphoric acid in excess of 10% by weight of the total, although a solubility under 2% is desirable. A converse tendency of water to dissolve in the extraction liquid is not ordinarily detrimental, provided the extraction liquid does not thereby acquire a water solubility in excess of the limit just mentioned.

While we have particularly specified the alcohol and aliphatic ester, we do not wish to exclude other substances which may be present, without departing from the scope of this invention, although the extraction liquid would ordinarily consist predominantly of an alcohol and ester of the type described. Particularly favorable results have been obtained by the use of an amyl alcohol. The term "amyl alcohol" as herein employed, denotes any of the pure amyl alcohols and/or any mixture of the isomeric amyl alcohols.

We find it of advantage to treat the mixture of sulphuric acid reaction products and insoluble material with not exceeding ten multiples by weight of the extraction liquid, although, for reasons of both economy and superiority of result, we prefer to employ not exceeding five multiples. In fact by proper selection of substances, the extraction efficiency is so high that not exceeding two multiples by weight of extraction liquid is sufficient for each unit of the mixture, while the purity of the end product is in inverse ratio to the total volume of liquid.

After the extraction liquid has been contacted with phosphatic material from the mineral acid treatment, the extraction liquid may be separated in any suitable manner, as, for example, decantation, filtration or centrifuging.

The last traces of the extraction liquid may be recovered by steaming the residue of undissolved material.

Various methods are available for the recovery of the phosphoric compounds from the extraction liquid.

The extraction liquid may be separated by distillation without preliminarily neutralizing the orthophosphoric acid, but in this case at least a part of the organic material in the extraction liquid may be broken down due to the dehydrating effect of the orthophosphoric acid. Where the extraction liquid contains alcohol, for example, it may be in part broken down during the distillation with the resultant conversion of part thereof into olefines, ethers may also be present. In this case the olefines and/or ethers may be separated by rectification, and utilized as such if desired, or alternatively the olefine material may be reacted with appropriate concentration of aqueous sulphuric acid to form alkyl sulphates, which are then hydrolyzed to reform the alcohol. The free orthophosphoric acid in the extraction liquid may also be converted into acid or neutral salts, for example, sodium or ammonium salts, by the addition of the desired base, and thereafter separated by crystallization.

Our process is particularly well adapted to the manufacture of exceptionally pure mono sodium phosphate. For the production of this material, a base in the sodium group, such as sodium carbonate, is added until the free orthophosphoric acid has been at least in part converted into mono sodium phosphate. The latter material is difficultly soluble in the extraction liquid and separates as an exceptionally pure form of this material.

Alternatively, we may add the selected inorganic base in combination with a weak acid, which acid will be displaced by the free phosphoric acid with the resultant formation of the desired phosphate either neutral or acid. We may also separate the phosphoric acid by converting it into acid or neutral salts of other inorganic bases, such as the phosphates of the alkaline earths, for example calcium phosphate or calcium acid phosphate. In general, we may separate phosphoric acid by converting it into any inorganic phosphate, either neutral or acid, by adding any desired inorganic base in reactable form with the consequent formation of neutral or acid phosphates which will be of lesser solubility in the extraction liquid than free phosphoric acid, and will therefore separate from the extraction liquid.

The term "phosphates" as hereinafter employed, will denote both acid and neutral phosphates.

The procedure which we have invented also comprehends a very simple and economical mode of separation of the phosphoric compounds from the extraction liquid, for on contacting the water immiscible extraction liquid with water the phosphoric compounds pass into the water layer. With certain extraction liquids, the orthophosphoric acid will pass almost completely into the water phase, and with other extraction liquids of the type hereinbefore described, a partition will result in which the phosphoric compounds ordinarily pass predominantly into the water layer. For this purpose we preferably operate with at least an equal volume of water for each volume of extraction liquid, and we find it advisable to so adjust the volume of the water as to produce a concentration of orthophosphoric acid therein in excess of 15% by weight, say between 15 and 30%. This process is not limited to the separation of orthophosphoric acid from the extraction liquid, for if desired, the orthophosphoric acid may be converted into any other water soluble form by appropriate treatment in the extraction liquid, and thereafter separating in the converted form by contacting the extraction liquid with water.

After contacting the extraction liquid with water it may ordinarily be recycled without further treatment, and utilized directly for the extraction of further batches of phosphoric material which have been treated with mineral acid. The orthophosphoric acid separated in the water phase may either be utilized as such, or converted by suitable treatment into any other form required by the market.

Another mode of recovering the phosphoric compounds from the extraction liquid consists in adding to the extraction liquid a second substance or substances, preferably liquid, which is soluble therein, but which is not per se a solvent for orthophosphoric acid, or which dissolves orthophosphoric acid to a much lesser extent than the extraction liquid. The hydrocarbons, and particularly the light hydrocarbons, say for example those of less than 15 carbon atoms to the molecule, are suitable for this purpose. The preferred liquid is benzol. The extent to which the orthophosphoric acid is thrown out of solution in the extraction liquid is a function of the amount of the second liquid added, and the extent to which it is desirable to carry the separation may be determined in any case by balancing the extent of recovery against the cost of separating the second liquid. It is of course desirable to so choose the second liquid that it may be cleanly separated from the water immiscible solvent by rectification. For this reason the second liquid should have a boiling point differing by at least 8° C. from the boiling point of the water immiscible solvent, and preferably should not form constant boiling point mixtures with the same. The orthophosphoric acid is thrown out of solution in the extraction liquid in the form of a concentrated aqueous solution, and this mode of separation is particularly desirable where a concentrated orthophosphoric acid is required.

The foregoing description is for purposes of illustration and not of limitation, and it is therefore our intention that the invention be limited only by the appended claims or their equivalents in which we have endeavored to claim broadly all inherent novelty.

We claim:

1. In the process of obtaining phosphoric acid or conversion products thereof from materials containing inorganic phosphates by admixing a phosphate containing material with sulphuric acid in quantity sufficient to form orthophosphoric acid, thereafter contacting the admixed materials with an extraction liquid consisting predominantly of an organic substance or substances, which extraction liquid is water immiscible and is a solvent for orthophosphoric acid, thereafter separating said extraction liquid and dissolved phosphoric acid from undissolved material and removing the dissolved phosphoric acid or conversion products thereof from said extraction liquid, the step of contacting said admixed materials with an extraction liquid consisting predominantly of a water immiscible mono hydroxyl alcohol of not exceeding 8 carbon atoms in the chain carrying the hydroxyl group and the aliphatic ester of an alcohol of not exceeding 8 carbon atoms in the chain carrying the hydroxyl group, said alcohol being present in the ratio of from 20 to 80 parts by weight of the total ester and alcohol.

2. In the process of obtaining phosphoric acid or conversion products thereof from materials containing inorganic phosphates by admixing a phosphate containing material with sulphuric acid in quantity sufficient to form orthophosphoric acid, thereafter contacting the admixed materials with an extraction liquid consisting predominantly of an organic substance or substances, which extraction liquid is water immiscible and is a solvent for orthophosphoric acid, thereafter separating said extraction liquid and dissolved phosphoric acid from undissolved material and removing the dissolved phosphoric acid or conversion products thereof from said extraction liquid, the step of contacting said admixed materials with an extraction liquid containing amyl alcohol and an aliphatic ester.

3. In the process of obtaining phosphoric acid or conversion products thereof from materials containing inorganic phosphates by admixing a phosphate containing material with sulphuric acid in quantity sufficient to form orthophosphoric acid, thereafter contacting the admixed materials with an extraction liquid consisting predominantly of an organic substance or substances, which extraction liquid is water immiscible and is a solvent for orthophosphoric acid, thereafter separating said extraction liquid and dissolved phosphoric acid from undissolved material and removing the dissolved phosphoric acid or conversion products thereof from said extraction liquid, the step of contacting said admixed materials with an extraction liquid containing amyl alcohol and an aliphatic amyl ester.

CHARLES H. MILLIGAN.
SIMON KLOSKY.